Sept. 6, 1949.　　　　W. RANDALL　　　　2,480,964
STORAGE BATTERY PLATE CONNECTION

Filed Dec. 20, 1946　　　　　　　　　　　3 Sheets-Sheet 1

WALTER RANDALL
*INVENTOR.*

BY
ATTORNEY

WALTER RANDALL
*INVENTOR.*

ATTORNEY

Sept. 6, 1949.  W. RANDALL  2,480,964
STORAGE BATTERY PLATE CONNECTION
Filed Dec. 20, 1946  3 Sheets-Sheet 3
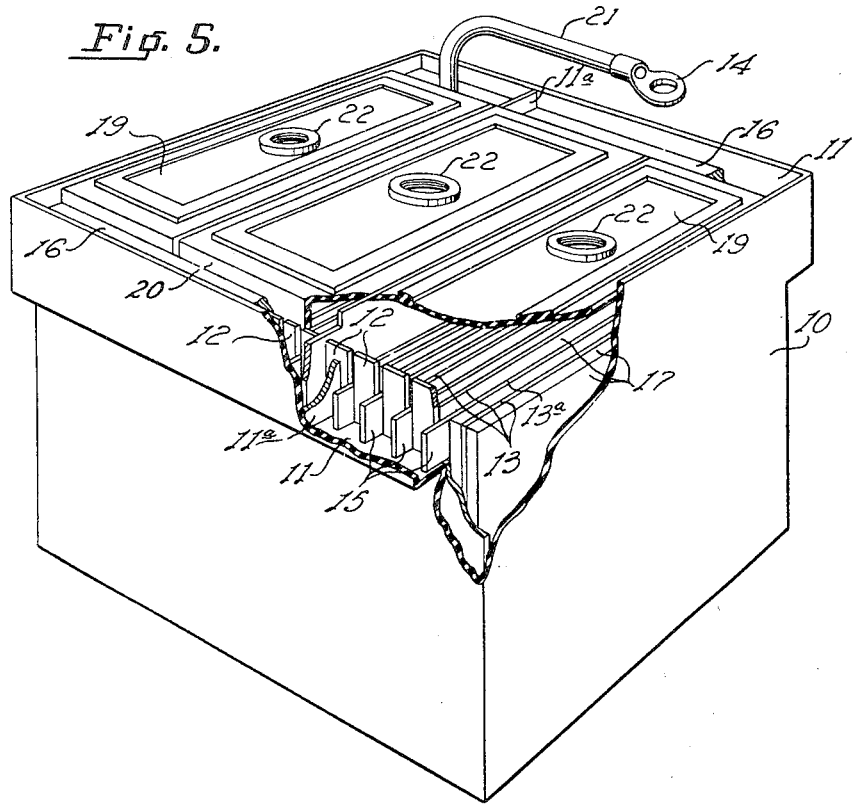
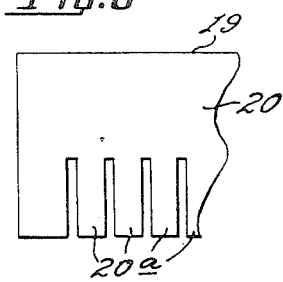
WALTER RANDALL
*INVENTOR.*
BY
ATTORNEY Patented Sept. 6, 1949

2,480,964

UNITED STATES PATENT OFFICE 2,480,964

STORAGE BATTERY PLATE CONNECTION

Walter Randall, Dallas, Tex.

Application December 20, 1946, Serial No. 717,430

2 Claims. (Cl. 136—80)

This invention relates to storage batteries and it has particular reference to new and useful improvements in the construction and assembly of lead acid storage batteries.

The principal object of the invention is to provide an improved storage battery and method of manufacture which will eliminate all pre-cast lead parts except the grids and will also reduce to a minimum the lead burning operations in assembling the pre-cast lead assembly parts.

Another object of the invention is to provide a simplified battery, having all of the prerequisites of the conventional storage battery yet lacking the comparatively expensive grid casting treatment and grouping as well as the lead burning and other operations.

Still another object of the invention is to provide a storage battery consisting primarily of a case having two troughs, one on each side, which have built-in combs or fingers whose function is to separate the plates and hold them in position as well as to seal and aid in preventing the melted lead and sealer from flowing into the case during the operations of assembling the battery. Through this provision, proper arrangement and installation of the plates requires little skill and can be accomplished in but a fractional part of the time required for the assembling of conventional batteries. Moreover, the subsequent finishing is equally as expedient, such as installing cell covers provided with end elements interlocking the fingers in the case; flowing lead into the troughs to contact the plates to form the respective groups into elements, the elements into cells and the cells into series, which operation simultaneously provides a lead for current output and ground.

With the foregoing and other objects in view, the invention has further reference to certain features of accomplishment which will become apparent as the description proceeds, taken in connection with the accompanying drawing wherein:

Figure 5 is a perspective view of the storage battery with portions of its cell covers and walls broken away to reveal the relationship of the plates, troughs and cell covers, and Figure 6 is a fragmentary end elevational view of one of the covers.

In old and well known types of lead acid storage batteries, the conventional method of assembling requires many pre-cast lead parts and many and varied operations. For example, after the grids have been cast and pasted with the oxides (active materials) the plates must be grouped, that is, the positive and negative plates must be placed in a jig or plate burning rack and a given number of each kind burned together to form a group and each group of plates must be burned to a pre-cast lead connector post with comb, six groups being required in a six volt battery of three cells. This requires six different operations, as stated and in addition, two more pre-cast lead connectors must be used to connect the cells in series, which also requires lead burning operations. All of these assembly operations, together with the casting of the lead assembly parts require sixteen different and time consuming operations.

The present invention provides a battery in which there are no pre-cast lead assembly parts and whose method of assembly eliminates all of the eight different lead burning operations ordinarily necessary to unit the conventional pre-cast lead parts. Thus is cut down the assembly operation to stacking the plates and only one lead burning operation which requires no pre-cast lead assembly parts at all.

Figure 1:
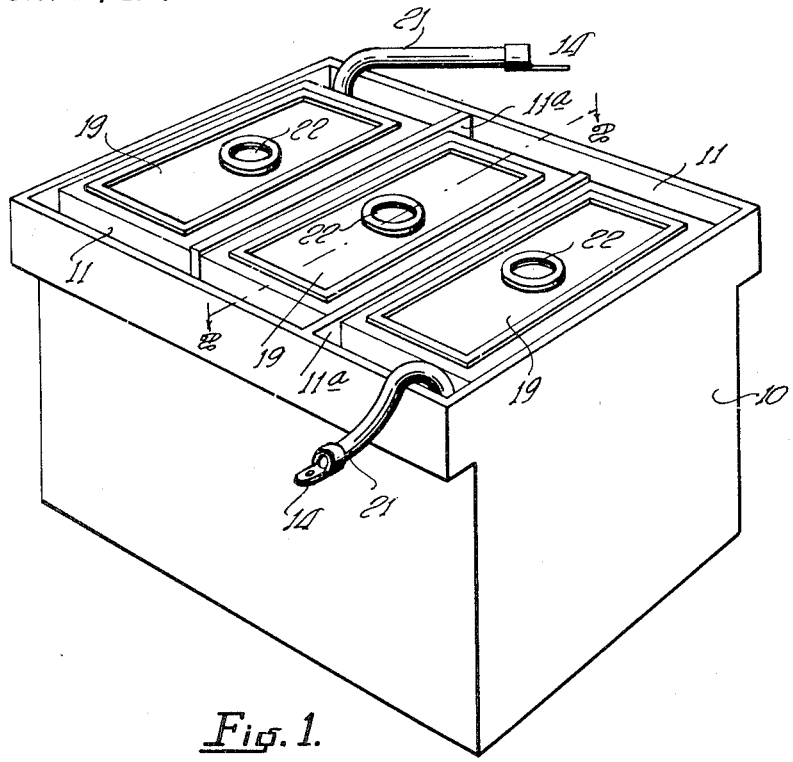
Figure 1 is a top perspective view of a storage battery constructed according to the present invention.

Continuing with a more detailed description of the drawings, reference is primarily made to Figure 1 in which numeral 10 denotes a molded rubber case, on each side of which is formed a trough 11 at the top. These troughs have built-in combs or fingers 12 to separate the plates 13 and to hold them in fixed relationship in the case, as well as to seal and help prevent melted lead, flowed into the troughs 11, for purposes to be presently described, from running into the case while assembling the parts of the battery.

The connector troughs 11 on the sides of the case are each divided by transverse partitions 11a into two, longitudinally aligned compartments of unequal length. These compartments are to provide for a connector mold. The smallest of the two compartments on each side is to provide not only a mold to connect the positive plates and negative plates of the end cells but also to provide for the out-put terminals 14.

Figure 2:
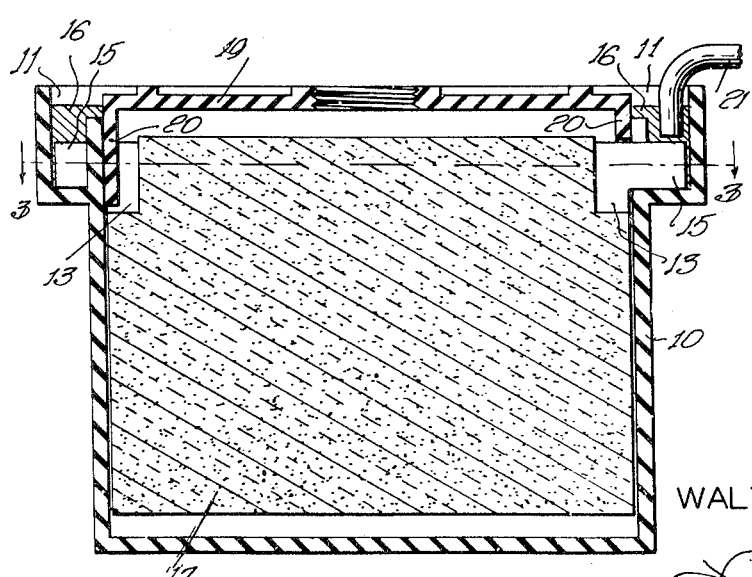
Figure 2 is an end view in vertical section taken on line 2—2 on Figure 1.

The plates are properly arranged and slipped into the case. The plate connector lugs 15 extend between the fingers 12 or through the slots defined thereby into the troughs 11 and by simply flowing melted lead 16 (Figure 2) into the troughs, the plates are connected or burned simultaneously into their proper groups, the groups to form the elements, the elements to form the cells and connect the cells in series and provide for the two out-put terminals or leads 14 with no pre-cast lead connector parts used at all and only one lead burning operation, thus cutting down the assembly operation to the mere plate stacking operation and the one lead burning operation.

The pasted plates are simply stacked or sandwiched alternately with the porous ceramic separators 17, that is, negative plate 13, separator 17, positive plate 13a, separator and so on until there are as many plates and separators as are necessary, depending upon the size and capacity of the battery. In the battery shown and described, there are eleven plates to each cell; three cells and thirty three plates, producing six volts. After the plates have been stacked, there are six negative and five positive plates which constitute the two groups and these two groups, together with their separators, constitute the elements necessary for one cell.

The stacking operation described is repeated three times to provide three stacks and separators. In each stack of plates all of the connector lugs 15 of one kind are on one side and all of another kind are on the opposite side. This assembly is the same for the three stacks.

To install the plates, the workman stands facing the front and side of the case 10. He picks up one stack of plates with the positive plate connector lugs next to him and slips the lugs 15 between the fingers 12 in the right end cell compartment and into the case. The plate connector lugs will extend between the fingers 12, as shown, and into the troughs 11 at the sides of the case. The positive plate connector lugs will lie in a compartment of the connector trough 11 of their own, thus to provide for terminal out-put of the battery or positive connector side to power out-put.

Still facing the battery case, the workman picks up another stack of plates and turns the negative plate connector lugs 15 towards him and slips the plate connector lugs between the fingers 12 in the middle cell of the case. The next and final stack of plates are then installed in a like manner with the connector lugs of the positive plates 13a directed towards the workman who slips them between the fingers 12 of the cell on the extreme left.

When all of the plates have been installed in the manner explained, all of the positive plate connector lugs of the cell at the extreme right and next to the workman, lie in an individual compartment of the trough 11, while all of the negative plate connector lugs of the center and middle cells next to the operator are negative and those on the opposite side are positive plate connector lugs. In the last cell or that at the extreme left and nearest the operator are the lugs of the positive plates. In other words, in the trough nearest the operator is disposed the positive plate connector lugs on the right and in an individual compartment of the foremost trough. In the center on the side toward the workman are all negative plate connector lugs and at the left on the opposite side are all positive plate connector lugs. There is no partition in the left hand trough when viewed in Figure 1 between the plate connector lugs of the left end cell and center cell. This is to provide for connecting the cells in series at this point.

Figure 3:
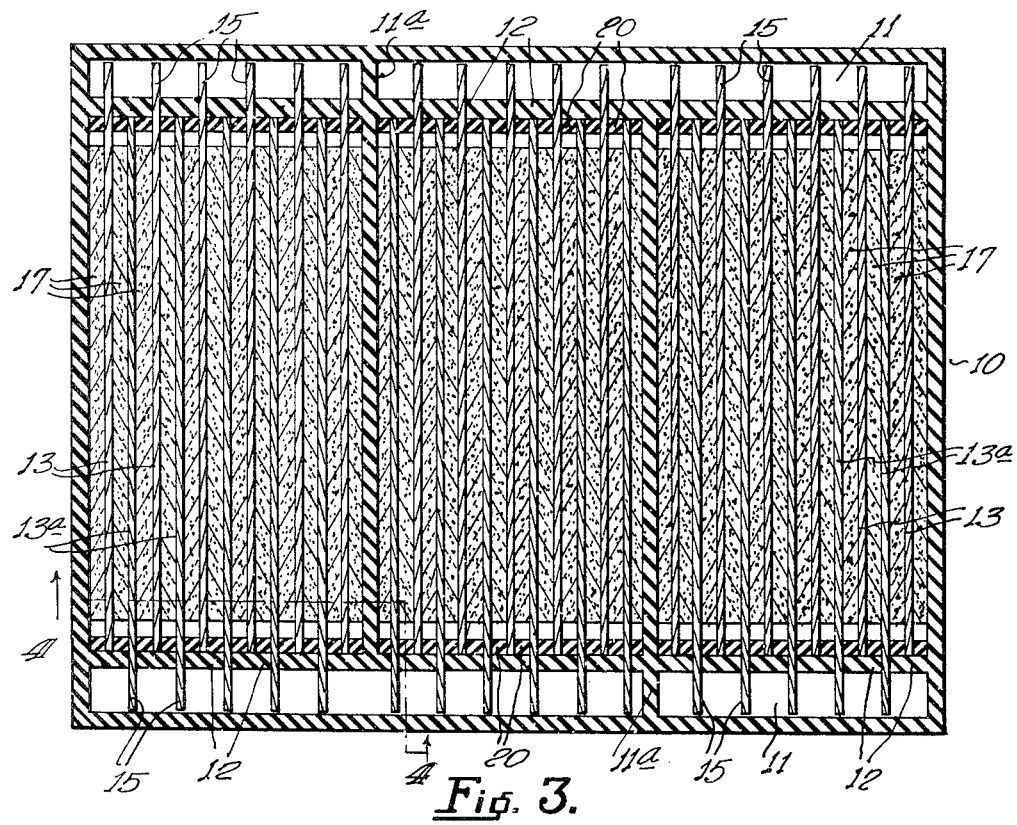
Figure 3 is a view in transverse section, taken on line 3—3 on Figure 2.
Figure 4:
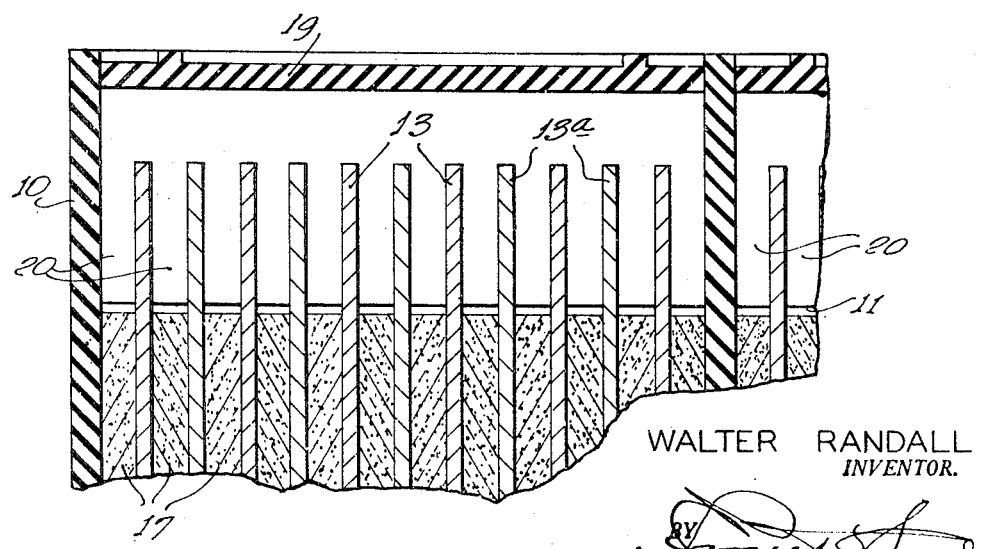
Figure 4 is a fragmentary view in vertical section, taken on line 4—4 on Figure 3.

On the opposite side of the battery case farthest from the workman, the plate connector lugs are arranged in a manner reverse to that described in the preceding paragraph, that is to say, there are negative connector lugs in the right end of the long compartment of the trough constitute the negative connector lugs of the right end cell while positive connector lugs occupy the opposite end of this long compartment and constitute the positive lugs of the center cell. The short compartment of the trough at the extreme left end of the case on the side farthest from the workman or as viewed in Figure 3 contains the negative connector lugs of the left end cell. This arrangement insures connection of the cells in series at this point. The left end compartment of the trough farthest from the operator contains all negative plate connector lugs and the partition defining this compartment provides for the ground or negative out-put terminal.

After having installed the plates in the manner described, cell covers 19 are placed on the individual cells. These covers of rubber are molded with end flanges 20 at right angles thereto and which flanges extend downwardly inside the case and behind the fingers 12, by virtue of corresponding parallel slots in the flanges defined by fingers 20a, which latter lie between the plate connector lugs 15 and prevent the melted lead and sealer from flowing down into the battery case from the connector trough while assembling the parts of the battery.

Melted lead is now flowed into the connector troughs 11 to the desired depth or just thick enough to carry the load required of it and to simultaneously burn or connect the plates 13 and 13a through their lugs 15, to form respective groups into elements, the elements into cells and the cells in series and further, to provide a lead for out-put of current from the battery and a ground lead.

The negative and positive current out-put terminals are identical in construction and while conventional wire terminals may be used, the terminal leads shown consist of flexible plastic tubes 21. One end of a tube is inserted into the connector trough 11 at the extreme right and nearest the operator. This will become the positive out-put terminal. Another tube is inserted into the connector trough 11 on the opposite side and in the compartment of the trough provided for the ground or negative out-put terminal. Melted lead is poured into each of these tubes whose ends will be anchored in the lead seal 16 in the troughs. A copper or metal tip is affixed to the end of each lead filled tube. This makes and provides two lead leads for final out-put of current from the battery.

If it is desired to employ a conventional wire lead, it is necessary only to insert a piece of wood or other material in the terminal ends of the connector troughs prior to filling with lead to form, upon removal, a small pocket. A post mold is then set over the pocket and poured full of melted lead. When the mold is removed, conventional post terminals are provided to which may be attached the cable clamps of the ordinary leads.

After filling each cell of the battery with water, conventional screw plugs are inserted into the filler openings 22, after which the battery is ready for use.

Manifestly, the construction as shown and described is capable of some modification and such modification as may be construed to fall within the scope and meaning of the appended claims is also considered to be within the spirit and intent of the invention.

What is claimed is:

1. A storage battery including a rubber case partitioned to define separate cells and having a longitudinal trough on each side along the top thereof, said troughs being defined on their inner sides by a row of closely spaced fingers perpendicular to the bottom of the trough, a group of negative and positive plates in each cell of said case, each having a lug on each upper corner thereof and extending between said fingers to hold said plates in parallelism in said case, separators between said plates, a lead seal in each of said troughs connecting said plates together through said lugs to form respective groups thereof into elements, the elements into cells and said cells in series.

2. In a storage battery, an insulated case having a plurality of compartments, a transversely partitioned trough on each side of said case, separated from the case proper by a longitudinal partition having a plurality of vertical slots defining fingers, a group of alternate negative and positive plates in each compartment of said case, a lug on one upper corner of each of said plates extending into a trough between the fingers of said longitudinal partitions, a cover for each compartment of said case having a right angle flange on each end slotted to receive the lugs on said plates, a lead flowed seal in each of said troughs adapted to burn said plates into groups, said groups into elements and said elements into cells and to secure said covers against displacement and a current out-put and ground means embedded in said lead seal.

WALTER RANDALL.

REFERENCES CITED

The following references are of record in the file of this patent:

UNITED STATES PATENTS

| Number | Name | Date |
|---|---|---|
| 647,177 | Chamberlain | Apr. 10, 1900 |
| 1,040,055 | Thompson | Oct. 1, 1912 |
| 1,874,404 | Wood | Aug. 30, 1932 |

FOREIGN PATENTS

| Number | Country | Date |
|---|---|---|
| 370,385 | Germany | May 22, 1921 |
| 419,460 | Great Britain | Nov. 13, 1934 |